US008412523B2

(12) United States Patent
Beach et al.

(10) Patent No.: US 8,412,523 B2
(45) Date of Patent: *Apr. 2, 2013

(54) DISTRIBUTED DICTATION/TRANSCRIPTION SYSTEM

(75) Inventors: Richard Beach, Louisville, CO (US);
Christopher Butler, Westminster, CO (US); Jon Ford, Broomfield, CO (US);
Brian Marquette, Longmont, CO (US);
Christopher Omland, Bozeman, MT (US)

(73) Assignee: nVoq Incorporated, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,151

(22) Filed: Mar. 16, 2012

(65) Prior Publication Data

US 2012/0185250 A1    Jul. 19, 2012

Related U.S. Application Data

(63) Continuation of application No. 12/339,366, filed on Dec. 19, 2008, now Pat. No. 8,150,689.

(60) Provisional application No. 61/016,198, filed on Dec. 21, 2007.

(51) Int. Cl.
 *G10L 15/26* (2006.01)
(52) U.S. Cl. ........................................................ 704/235
(58) Field of Classification Search .................... 704/235
See application file for complete search history.

(56) References Cited

U.S. PATENT DOCUMENTS

| 5,642,519 | A | 6/1997 | Martin |
| 5,754,978 | A | 5/1998 | Perez-Mendez et al. |
| 5,870,454 | A | 2/1999 | Dahlen |
| 5,956,024 | A | 9/1999 | Strickland et al. |
| 5,991,712 | A | 11/1999 | Martin |
| 6,100,882 | A | 8/2000 | Sharman et al. |
| 6,122,614 | A * | 9/2000 | Kahn et al. ...................... 704/235 |
| 6,173,259 | B1 | 1/2001 | Bijl et al. |
| 6,332,154 | B2 | 12/2001 | Beck et al. |
| 6,366,882 | B1 | 4/2002 | Bijl et al. |
| 6,381,640 | B1 | 4/2002 | Beck et al. |
| 6,385,586 | B1 | 5/2002 | Dietz |
| 6,477,493 | B1 | 11/2002 | Brooks et al. |
| 6,507,816 | B2 | 1/2003 | Ortega |
| 6,526,380 | B1 | 2/2003 | Thelen et al. |
| 6,622,121 | B1 | 9/2003 | Crepy et al. |

(Continued)

FOREIGN PATENT DOCUMENTS

| JP | 8044740 | 2/1996 |
| WO | 00/58945 A1 | 10/2000 |

OTHER PUBLICATIONS

International Searching Authority, "Notification of Transmittal of the International Search Report and the Written Opinion of the International Searching Authority, or the Declaration;" PCT Appl. No. PCT/US08/87614; Feb. 10, 2009.

*Primary Examiner* — Susan McFadden
(74) *Attorney, Agent, or Firm* — Holland & Hart LLP

(57) ABSTRACT

A distributed dictation/transcription system is provided. The system provides a client station, dictation manager, and dictation server networked such that the dictation manager selects a dictation server to transcribe audio from the client station. The dictation manager selects one of a plurality of dictation servers based on conventional load balancing and on a determination of whether the user profile is already uploaded to a dictation server. While selecting a dictation server or uploading a profile, the client may begin dictating, which audio would be stored in a buffer of dictation manager until a dictation server was selected or available. The user may receive in real time or near real time a display of the textual data that may be corrected by the user to update the user profile.

21 Claims, 7 Drawing Sheets

U.S. PATENT DOCUMENTS

| | | |
|---|---|---|
| 6,643,622 B2 | 11/2003 | Stuart et al. |
| 6,704,709 B1 | 3/2004 | Kahn et al. |
| 6,766,294 B2 | 7/2004 | MacGinite et al. |
| 6,785,654 B2 | 8/2004 | Cyr et al. |
| 6,820,055 B2 | 11/2004 | Saindon et al. |
| 7,006,967 B1 * | 2/2006 | Kahn et al. .................. 704/235 |
| 7,035,804 B2 | 4/2006 | Saindon et al. |
| 7,047,192 B2 | 5/2006 | Poirier |
| 7,103,542 B2 | 9/2006 | Doyle |
| 7,107,161 B2 | 9/2006 | Ahmed et al. |
| 7,120,700 B2 | 10/2006 | Macleod Beck et al. |
| 7,130,401 B2 | 10/2006 | Rampey et al. |
| 7,136,462 B2 | 11/2006 | Pelaez et al. |
| 7,181,413 B2 | 2/2007 | Hadden et al. |
| 7,184,539 B2 | 2/2007 | Colson et al. |
| 7,228,275 B1 | 6/2007 | Endo et al. |
| 7,249,019 B2 | 7/2007 | Culy et al. |
| 7,257,531 B2 | 8/2007 | Holub |
| 7,260,534 B2 | 8/2007 | Gandhi et al. |
| 7,292,975 B2 | 11/2007 | Lovance et al. |
| 7,711,568 B2 | 5/2010 | Arizmendi et al. |
| 8,150,689 B2 * | 4/2012 | Beach et al. .................. 704/235 |
| 2002/0032591 A1 | 3/2002 | Mahaffy et al. |
| 2003/0050777 A1 | 3/2003 | Walker |
| 2003/0105623 A1 | 6/2003 | Cyr et al. |
| 2003/0191643 A1 | 10/2003 | Belenger et al. |
| 2004/0064322 A1 | 4/2004 | Georgiopoulos et al. |
| 2004/0199393 A1 | 10/2004 | Arizmendi et al. |
| 2004/0215449 A1 | 10/2004 | Roy |
| 2005/0159959 A1 | 7/2005 | Benco |
| 2005/0197836 A1 | 9/2005 | Cohen et al. |
| 2005/0234727 A1 | 10/2005 | Chiu |
| 2006/0093103 A1 | 5/2006 | Timmins et al. |
| 2006/0095259 A1 | 5/2006 | Bahl et al. |
| 2006/0167686 A1 | 7/2006 | Kahn |
| 2006/0190250 A1 | 8/2006 | Saindon et al. |
| 2006/0282265 A1 | 12/2006 | Grobman et al. |
| 2007/0050238 A1 | 3/2007 | Carr et al. |
| 2007/0133518 A1 | 6/2007 | Ben-David et al. |
| 2007/0156400 A1 | 7/2007 | Wheeler |
| 2007/0174390 A1 | 7/2007 | Silvain et al. |
| 2008/0052076 A1 | 2/2008 | Metz |
| 2008/0082932 A1 | 4/2008 | Beumer |
| 2010/0204989 A1 | 8/2010 | Boes et al. |

* cited by examiner

DISTRIBUTED DICTATION/TRANSCRIPTION SYSTEM

CLAIM OF PRIORITY UNDER 35 U.S.C. §§119 AND 120

This application is a continuation of U.S. patent application Ser. No. 12/339,366, titled Distributed dictation/transcription system, filed Dec. 19, 2008, now U.S. Pat. No. 8,150,689, which claims priority to U.S. Provisional patent Application Ser. No. 61/016,198, filed Dec. 21, 2007, titled REAL-TIME DISTRIBUTED DICTATION/TRANSCRIPTION, the disclosures of which are incorporated herein as if by reference.

REFERENCE TO CO-PENDING APPLICATIONS FOR PATENT

None.

BACKGROUND

1. Field

The technology of the present application relates generally to dictation systems, and more particular, to a distributed dictation system that is adapted to return in real-time or near real-time a transcription of the dictation.

2. Background

Originally, dictation was an exercise where one person spoke while another person transcribed what was spoken. With modern technology, dictation has advanced to the stage where voice recognition and speech-to-text technologies allow computers and processors to serve as the transcriber.

Current technology has resulted in essentially two styles of computer based dictation and transcription. One style involves loading software on a machine to receive and transcribe the dictation, which is generally known as client side dictation. The machine transcribes the dictation in real-time or near real-time. The other style involves saving the dictation audio file and sending the dictation audio file to a centralized server, which is generally known as server side batch dictation. The centralized server transcribes the audio file and returns the transcription. Often the transcription is accomplished after hours, or the like, when the server has less processing demands.

As can be appreciated, the present computer based dictation and transcription systems have drawbacks. One drawback of the client side dictation is that the dictation and transcription is limited to a single or particular machine, sometimes referred to as a thick or heavy client as most of the processing is accomplished at the local user's machine. Thus, unless the user has the particular machine available, the user cannot accomplish dictation. One drawback of server side batch dictation is that the transcript is not provided in real or near real-time. So, while the server side batch dictation systems may use thin clients, the transcription is not provided in real-time or near real-time.

Moreover, the return time for transcriptions are related to the processing power of the machine accomplishing the transcription. Thus, thick or heavy client machines may have long delays between speech and the transcription being returned. Often thick or heavy client machines in the end rely on server side batch dictation as they lack sufficient processing power. In either case, the return is delayed, sometimes significantly.

Published U.S. Patent Application Publication Number 2006/005259 filed by Bahl et al. (hereinafter Bahl), provides a thin client distributed dictation/transcription system. The disclosure of Bahl is incorporated herein by reference as if set out in full. In particular, Bahl discloses using a wireless device, such as a cellular phone, a personal digital assistant, or other electronic device to transmit audio to a networked service manager. The service manager includes a resource management component and a profile management component. The resource management component, on receipt of the audio, selects one of a plurality of transcription servers networked to the service manager. Once a transcription server is selected and the transcription server accepts the task, the service manager identifies a user or a default voice profile that is uploaded over a network to the transcription server. The transcription server is selected by the resource management component of the service manger using factors such as processor availability, network bandwidth, proximity, and the like, where such factors are consistent with typical load balancing devices. Once selected, the audio is sent to the transcription server, which converts the audio to text. Bahl does not return the transcription to the client and does not indicate what, if anything is done with the text or transcription file.

Thus, against this background, it is desirable to develop an improved distributed, real or near real-time dictation and transcription system.

SUMMARY

To attain the advantages and in accordance with the purpose of the technology of the present application, a distributed, real-time dictation system is provided. The distributed, real-time dictation system includes a client station connected to a dictation manager via a network connection. The dictation manager identifies a dictation server that includes a speech transcription engine that converts the speech from an audio stream or file to transcription results, such as text files or meta data, and returns the transcription results to the client station in real, or near real time. The dictation manager in selecting a transcription engine identifies if one of the available transcription engines has previously been used by the same client and selects that transcription engine as the user profile is already uploaded to the transcription engine.

Aspects of the technology of the present invention provide a remote client station that simply requires the ability to transmit audio files via a streaming connection to the dictation manager or the dictation server. The dictation server can return the transcription results via the dictation manager or via a direct connection depending on the configuration of the system.

DETAILED DESCRIPTION

The technology of the present application will now be explained with reference to FIGS. 1-7. While the technology of the present application is described with relation to internet connections and streaming audio over an internet connection using conventional streaming protocols, one of ordinary skill in the art will recognize on reading the disclosure that other configurations are possible. For example, the technology of the present application is described with regard to a thin client station but more processor intensive options could be deployed. Moreover, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Figure 1:
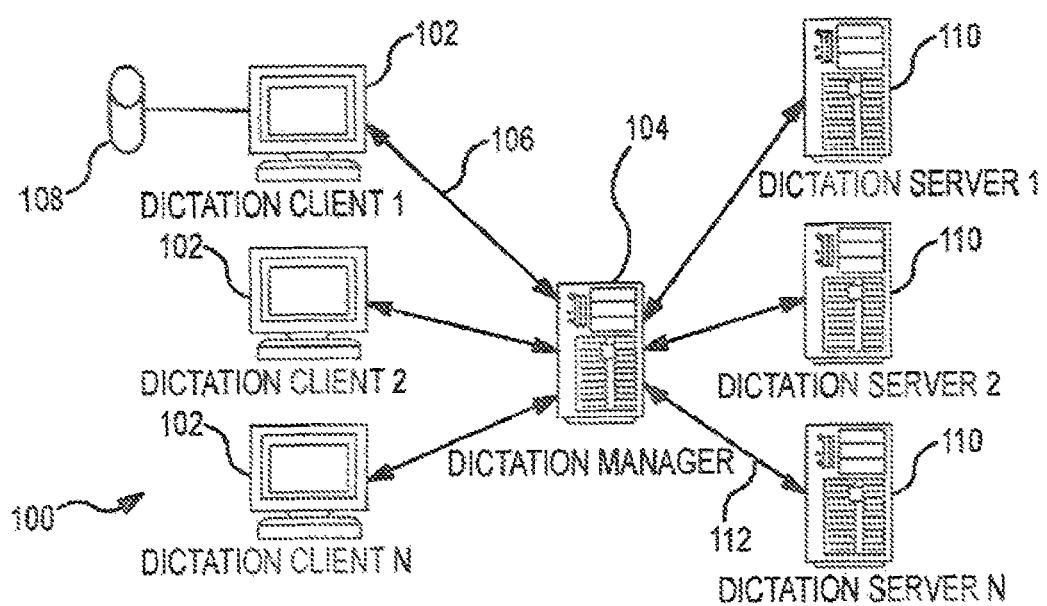
FIG. 1 is a functional block diagram of an exemplary system consistent with the technology of the present application.

Referring first to FIG. 1, a distributed dictation system 100 is provided. Distributed dictation system 100 may provide transcription of dictation in real-time or near real-time allowing for delays associated with transmission time, processing, and the like. Of course, delay could be built into the system to allow, for example, a user the ability to select either real-time or batch transcriptions services. For example, to allow batch transcription services, system 100 may cache audio files at a client device, a server, a transcription engine or the like to allow for later transcription of the audio file to text that may be returned to the client station or retrieved by the client at a later time.

As shown in distributed dictation system 100, one or more client stations 102 are connected to a dictation manager 104 by a first network connection 106. First network connection 106 can be any number of protocols to allow transmission of audio information using a standard Internet protocol. Client station 102 would receive audio (i.e., dictation) from a user via a microphone 108 or the like. While shown as a separate part, microphone 108 may be integrated into client station 102, such as, for example, a cellular phone. Also, while shown as a monitor or computer station, client station 102 may be a wireless device, such as a wifi enabled computer, a cellular telephone, a PDA, a smart phone, or the like. Client station 102 also may be a wired device, such as a laptop or desktop computer, using conventional internet protocols to transmit audio.

Dictation manager 104 may be connected to one or more dictation servers 110 by a second network connection 112. Second network connection 112 may be the same or different than first network connection. Second network connection also may be any of a number of conventional wireless or wired connection protocols. Dictation manager 104 and dictation server 110 may be a single integrated unit connected via a PCI bus or other conventional bus. Each dictation server 110 incorporates or accesses a speech transcription engine as is generally known in the art. Operation of the speech transcription engine will not be further explained herein except as necessary in conjunction with the technology of the present application as speech recognition and speech transcription engines are generally understood in the art. For any given dictation, dictation manager 104 would direct the audio file from client station 102 to an appropriate dictation server 110 that would transcribe the audio and return transcription results, i.e., the text of the audio. The connection between client station 102 and dictation server 110 may be maintained via dictation manager 104. Alternatively, a connection may be established directly between client station 102 and dictation server 110. Additionally, dictation manager 104 may manage a number of simultaneous connections so several client stations 102 and dictation servers 110 can be managed by dictation manager 104. Dictation manager 104 also provides the added benefit of facilitating access to between multiple client stations and multiple dictation servers over, for example, using a conventional call center where management and administration of changing clients is difficult to accomplish.

Network connections 106 and 112 may be any conventional network connections capable of providing streaming audio from client station 102 to dictation manager 104 and from dictation manager 104 to the dictation server 110. Moreover, dictation manager 104 may manage the transmission of data in both directions. From the client station 102, dictation manager 104 receives the audio stream and directs the audio stream to a dictation server 110. The dictation server 110 transcribes the audio to text and transmits the text to dictation manager 104 and dictation manager 104 directs the text back to client station 102 to display on a monitor or other output device associated with client station 102. Of course, similar to caching the audio for later transcription, the text may be stored for later retrieval by the user of client station 102. Storing the text for later retrieval may be beneficial for situations where the text cannot be reviewed due to conditions, such as driving a car, or the client station does not have a sufficient display to name but two situations. Network connections 106 and 112 allow streaming data from dictation server 110 though dictation manager 104 to client station 102. Dictation manager 104 may manage the data as well. Client station 102 would use the data from dictation server 110 to populate a display on client station 102, such as, for example, a text document that may be a word document.

Figure 2:
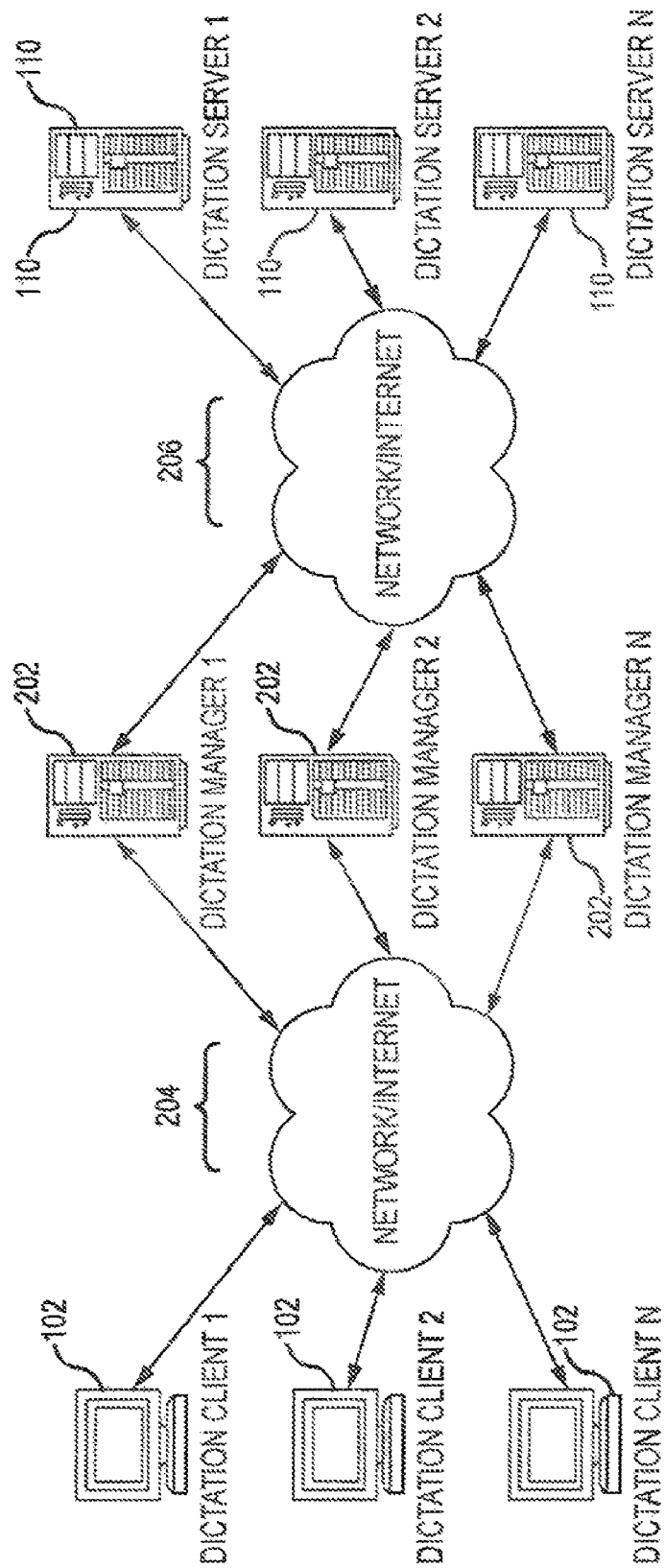
FIG. 2 is a functional block diagram of an exemplary system consistent with the technology of the present application.

Referring now to FIG. 2, a distributed dictation system 200 is provided. Distributed dictation system 200 is similar to distributed dictation system 100, but includes a number of dictation managers 202. Also, client stations 102 are connected to one of the dictation managers 202 via a first network connection 204 where the first network connection 204 is an Internet connection or World Wide Web connection. Moreover, dictation manager 202 is connected to dictation servers 110 via a second network connection 206 where the second network connection 206 also is an Internet connection or World Wide Web connection. As can be appreciated, the technology of the present application is a very robust and scalable solution for remote dictation.

Figure 3:
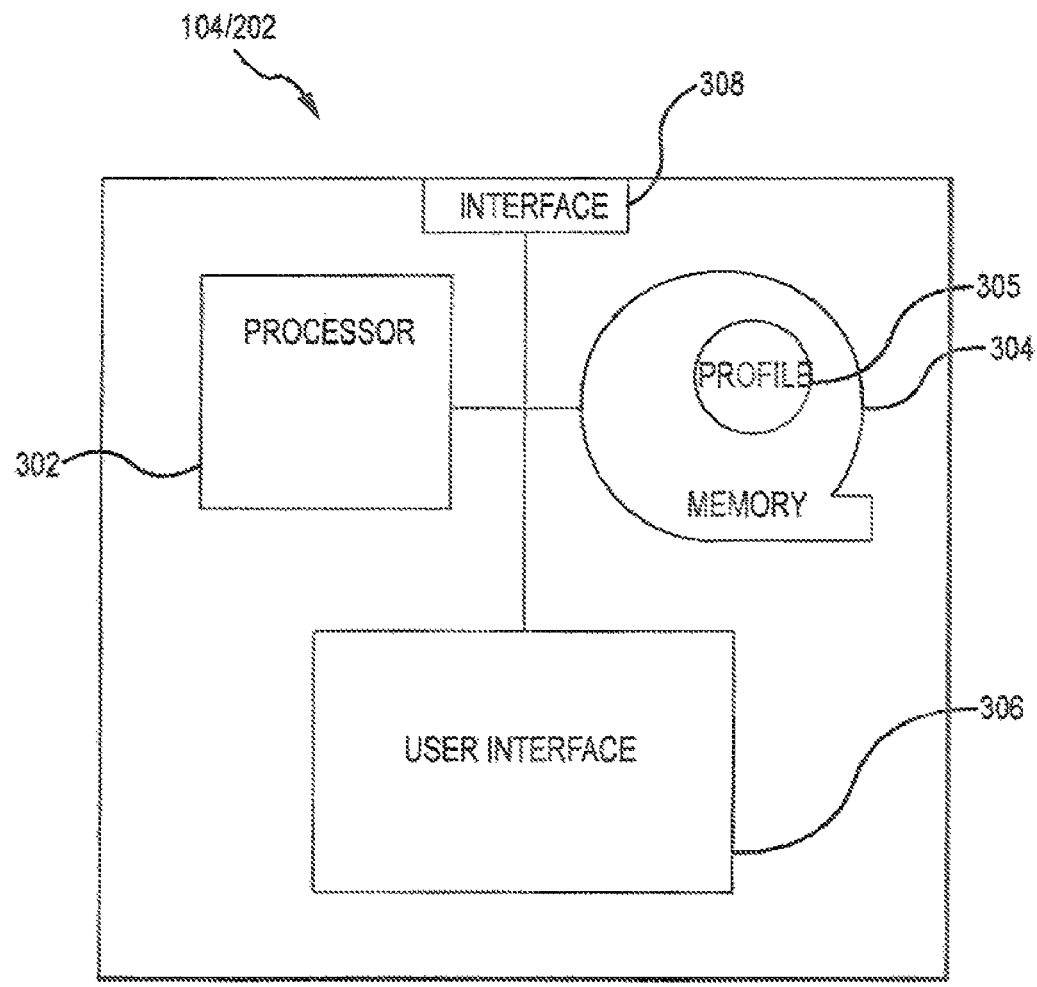
FIG. 3 is a functional block diagram of dictation manager and dictation server of FIG. 2.

Referring to FIG. 3, dictation manager 104 is shown in more detail. Dictation managers 202 would be substantially similar. Dictation manager 104/202 includes a processor 302, such as a microprocessor, chipsets, field programmable gate array logic, or the like, that controls the major functions of the manager, such as, for example, obtaining a user profile with respect to a user of client station 102, selection of a dictation server 110, or the like. Processor 302 also processes various inputs and/or data that may be required to operate the dictation manager 104/202. Dictation manager 104/202 also includes a memory 304 that is interconnected with processor 302. Memory 304 may be remotely located or co-located with processor 302. The memory 304 stores processing instructions to be executed by processor 302. The memory 304 also may store data necessary or convenient for operation of the dictation system. For example, memory 304 may store the transcription for the client so that the transcription may be processed later by the client. At least a portion of memory 304 includes user profiles 305 associated with users of distributed dictation system 100 or distributed dictation system 200. User profiles 305 would be associated with individual users by a pass code, user identification number, biometric information or the like and is usable by dictation servers 110 to facilitate the speech transcription engine in converting the audio to text. Associating users and user profiles using a database or relational memory is not further explained except in the context of the present invention. Memory 304 may be any conventional media and include either or both volatile or nonvolatile memory. Dictation manager 104/202, optionally, may be preprogrammed so as not to require a user interface 306, but typically dictation manager 104/202 includes user interface 306 that is interconnected with processor 302. Such user interface 306 could include speakers, microphones, visual display screens, physical input devices such as a keyboard, mouse or touch screen, track wheels, cams or special input buttons to allow a user to interact with dictation manager 104/202. Dictation managers have a network interface 308 (as would the client station and the dictation server) to allow transmissions and reception of data (text, audio, or the like) between networked devices. Client station 102 and dictation servers 110 would have structure similar to the dictation manager.

Dictation manager 104/202 would accept requests from client station 102 and direct the streaming audio to dictation servers 110 in any of a number of conventional manners. One exemplary methodology is provided in U.S. Pat. No. 7,185,094, issued on Feb. 27, 2007, to Marquette et al., titled Media session framework using a control module to direct and manage application and service servers, the disclosure of which is incorporated herein by reference as if set out in full. Using the methodology, dictation manager 104, for example, would receive a request for dictation services from client station 102. Dictation manager 104 would send a service request to the dictation servers 110 until one of the dictation servers 110 sends back an acceptance of the service request. Audio would then be streamed from client station 102 to the dictation manager 104 which would in turn stream the audio to dictation server 110. Dictation server 110 would then transcribe dictation by using the speech transcription engine associated with dictation server 110, and the transcription results would be sent back to client station 102 through the dictation manager 104 as textual data. Alternatively, or in combination with the above, processor 302 could incorporate a load balancing device similar to the resource manager service discussed in Bahl.

Figure 4:
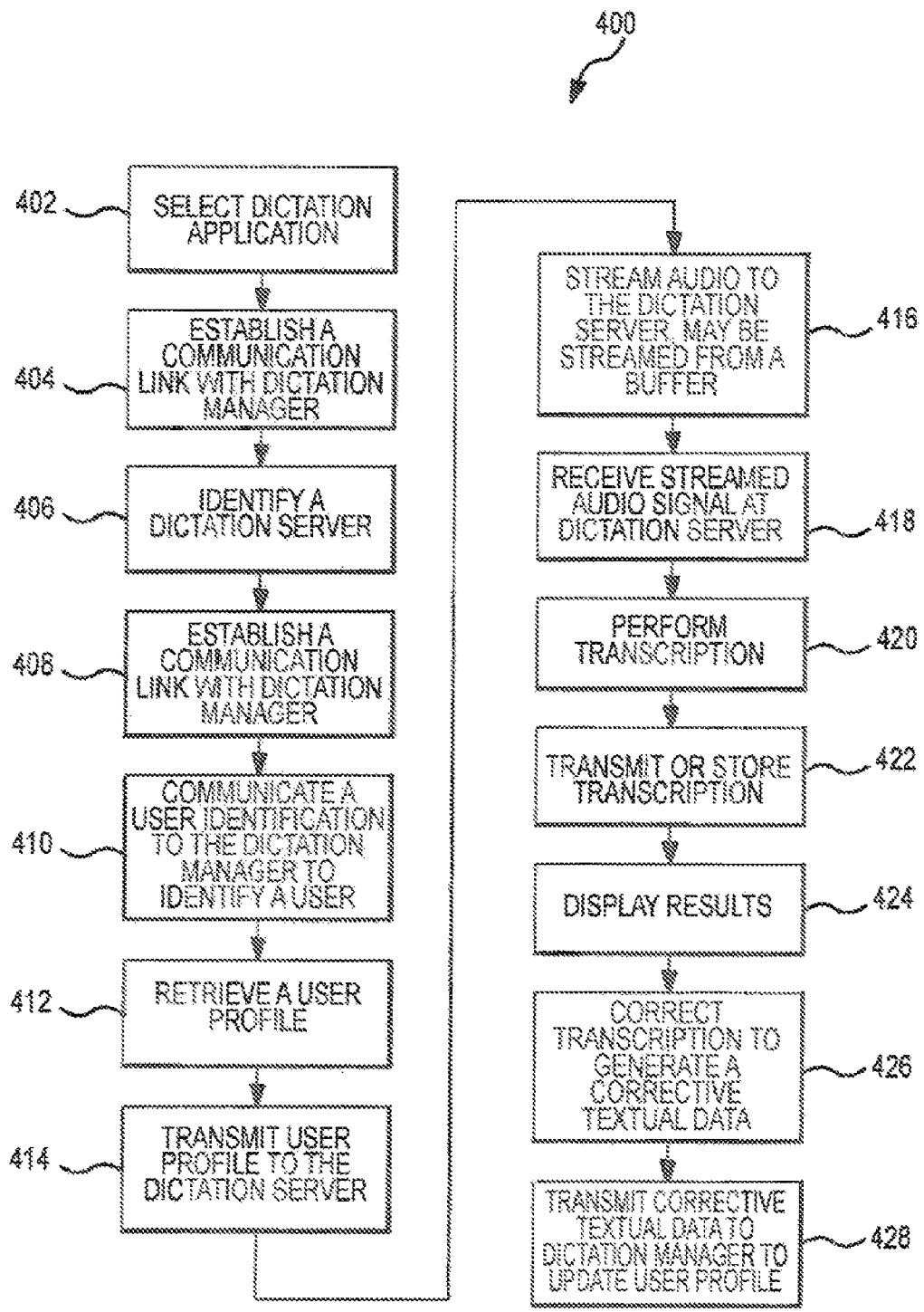
FIG. 4 is a functional block diagram illustrative of a methodology consistent with the technology of the present application.

Referring now to FIG. 4, a flow chart 400 is provided illustrative of a methodology of using the technology of the present application. While described in a series of discrete steps, one of ordinary skill in the art would recognize on reading the disclosure that the steps provided may be performed in the described order as discrete steps, a series of continuous steps, substantially simultaneously, simultaneously, in a different order, or the like. Moreover, other, more, less, or different steps may be performed to use the technology of the present application. In the exemplary methodology, however, a user at client station 102 would first select a dictation application from a display 116 on client station 102, step 402. The selection of an application that has been enabled for dictation that can be either a client or web based application. The application may be selected using a conventional process, such as, for example, double clicking on an icon, selecting the application from a menu, using a voice command, or the like. Alternatively to selecting the application from a menu on a display, client station 102 may connect to the server running the application by inputting an internet address, such as a URL, or calling a number using conventional call techniques, such as, for example PSTN, VoIP, a cellular connection or the like. The application as explained above may be web enabled, loaded on the client station, or a combination thereof. Client station 102 would establish a connection to dictation manager 104 using a first network connection 106/204, step 404. Dictation manager 104 may be integrated into one of the client station 102 as a matter of design choice or a stand alone unit as shown. The first network connection could be via a LAN, WAN, WLAN, VViFi, Ethernet, WiMax, Bluetooth, Internet or the like. Alternatively, the connection may be a bus or ribbon, such as, for example, a PCI bus. The dictation manager next identifies and connects to one of the dictation servers 110 via a second network connection, steps 406/408. The second network connection also could be any of a LAN, WAN, WLAN, WiFi, Ethernet, WiMax, Bluetooth, Internet or the like. Alternatively, the second connection also may be a bus, ribbon, or the like. The selection of a dictation server 110 for an exemplary embodiment will be further described below. Typically, the first and second network connections would be the same, but they do not need to be the same. Once the communication link of step 404 is established, the user of client station 102 may begin dictating audio to be transcribed. The audio signal would be stored in a buffer associated with memory 304 until the communication link of step 408 is established. At that time, the dictation manager 104/202 may transmit an audio signal to the dictation server as explained below. Using most conventional free form dictation processes today, dictation server 110 and an associated speech transcription engine will use a user profile to facilitate transcription of the dictation. Thus, the user of client station 102 optionally transmits a user identification to the dictation manager, step 410. The dictation manager would retrieve a user profile based on the user identification, step 412. The user identification could be any conventional identification, such as, for example, a user password, a user identifier, a device identifier, a biometric identifier, or any association as is generally understood in the art. The user profile is transmitted to dictation server 110 to facilitate transcription, step 414. Once the connection between the client station 102 and dictation server 110 is established though the dictation manager 104 and the user profile (if available or necessary) is uploaded to dictation server 110, client station 102 streams audio (i.e., dictation) to dictation server 110 though dictation manager 104, step 416. The audio signal may be stored in a buffer associated with memory 304 of dictation manager 104/202 or streamed from client station 102 through dictation manager 104/202 or streamed directly from client station 102 to dictation server 110. Optionally, client station 102 may provide controls such as, start, stop, pause, reverse, etc., similar to a conventional tape to start, stop, pause, or the like, of dictation manager 104. One type of control may simply be a talk icon on display 116 that a user would click to begin dictation and click to cease dictation. Dictation manager 104 receives the streamed audio from client station 102 and directs the audio to a speech recognition engine, step 418. Optionally, the audio signal may be streamed from a buffer as mentioned above, streamed from client station to dictation manager to dictation server or directly from client station to dictation server. Speech transcription engine converts the audio to text—in other words—performs transcription, step 420, and transmits the transcription result to dictation manager 104 which in turn transmits the transcription result to client station 102 by, for example, streaming or downloading the text to client station 102, step 422. The transcription file may be generally referred to as textual data. Alternatively or in combination with sending the textual data directly to the client station, the textual data may be stored in memory 304. Client station 102 displays the transcription results, such as, for example, supplying text in a word document on display 116 of client station 102, step 424. The user may use client station 102 to correct the textual data from the transcription file to generate corrective textual data, step 426. The corrective textual data may be transmitted back to dictation manager 104/202 to update the user profile with the corrections in a manner generally known in the art associated with training a user profile, step 428.

To avoid inadvertently holding resources, the connection between client station 102 and dictation manager 104 or connections between dictation manager 104 and dictation server 110 may optionally have a time out feature where a period of silence for a predetermined time would cause a connection break so either the client station 102 or the dictation server 110 could be freed for other uses.

Notice, optionally, if a dictation server 110 is not available, the dictation manager may batch or cache the audio file in, for example, memory 304 until a dictation server becomes available. Thus, the dictation may be delayed, but provided as soon as a dictation server is available to begin the dictation. The batch or cache of audio also could allow the user to begin dictation while the dictation server is uploading the user profile. In this case, a buffer, such as memory 304, may store the audio file until a dictation server becomes available. Once available, the dictation manager 104 may stream the audio from the buffer to the dictation server.

Optionally, a user at client station 102 may select batch style dictation to conserve processing resources. In this instance, client station 102, dictation manager 104/202, dictation server 110, or some other accessible memory may store the audio file for later processing.

Using the technology of the present application provides a distributed, real or near real time server based dictation. This technology allows remote users to connect to a dictation server from anywhere in the world to perform a real time or near real time transcription. This technology of the present application allows many advantages which include, for example, Dynamic user profile loading;
Dictation affinity;
Dictation load balancing;
Corrective and real time training;
Distributed audio and user profile data;
High availability of dictation servers; and
Adaptive Training.

Dynamic User Profile Loading

Current dictation systems force the user profile to be set in advance to transcription. In other words, the user profile must be loaded on the machine performing the transcription, which in the present application corresponds to the dictation servers. Bahl, for example, either uploads the user profile or uses a default profile pre-stored at the dictation server. Only after uploading of the user profile is an acknowledgement sent to the client device to begin transcription. The technology of the present application allows for real time user profile loading such that the user can begin dictation prior to uploading a user profile and, in fact, prior to even identifying a transcription engine. The framework allows any application developer to determine which user profile to load and when to load it. The user profile can be loaded while the user is still speaking resulting in faster transcription times, removing the batch nature and introducing real time server based transcriptions. Moreover, as will be described further below, the present technology will remember which dictation servers still have valid user profiles uploaded. The dictation manager will, in some embodiments, preferentially select those dictation servers to reduce the need to upload a user's profile multiple times.

Dictation Affinity

The technology of the present application provides a dictation framework to support a new affinity for transcriptions being performed by users. The technology developed can track which server was last used for the current user's transcription and direct the request to that server. This avoids the problem of the server having to reload the user profile and increases the speed in which the transcription of audio can occur. In addition to this optimized profile management, the technology of the present application provides a dictation framework that provides priority based dictation. This allows high priority transcriptions from users to be processed before other transcription requests are processed.

Dictation Server Load Balancing

The technology of the present application provides a dictation framework that allows for dictation server load balancing. This technology allows user requests to be spread across multiple servers to improve user transcription time. The load balancing is facilitated by the dictation manager which maintains a list of available dictation servers and the state of these servers. Load balancing decisions will be made based on server state. The load balancing may be triggered by, but not limited to, queue length, average time to process requests, CPU utilization, memory utilization, user class, or available disk space.

Corrective and Real Time Training

The technology of the present application provides a dictation framework that allows for real time correct training for dictation user profiles to the extent user profiles are necessary to facilitate dictation and transcription. This is performed by allowing users the ability to modify the transcription results and feed these back to the server in real time. The dictation servers then run the training algorithm with the modified text and the stored audio file. The modified user profile is then republished to all dictation servers.

The technology of the present application may be implemented to provide real time training through a Java API. This allows the training API to be plugged into any application and allow access to server based training. This allows the technology of the present application to remove the dependency of the user having to have access to the server to provide training data and execute the batch training application—i.e., training can be from anywhere at any time.

Distributed Audio and User Profile Data

Using the technology of the present application provides a dictation framework that users are allowed to store and retrieve user profiles and dictation audio through a distributed network. Traditional dictation processes require the user profile data and user audio to be stored locally. The dictation framework is able to store and retrieve the dictation user profile and audio on any network storage device. This solves the constraint of the audio having to be supplied locally through the system running the dictation process. The dictation framework does not care where the audio input is coming from. It can come from, but is not limited to, audio, telephone, media gateway, RTP, RMI, or Citrix for example.

High Availability of Dictation Servers

The technology of the present application provides a dictation framework that makes dictation servers highly available. The dictation framework has the ability to recover from dictation server crashes and overloaded dictation servers. When the dictation manager is overloaded or reached a predetermined number of dictation server registrations, it will direct servers and user requests to another dictation manager that is configured for dictation requests. Dictation managers are also able to manage a dynamic set of dictation servers. Today if users run a dictation process on their desktop, they must always work from that desktop or ensure they can copy their profile to new desktops. The other option for users is to submit a batch request to a server and receive results at some unknown time. With the technology of the present application, the dictation framework provides users the ability to obtain a level of n+k redundancy.

Figure 5:
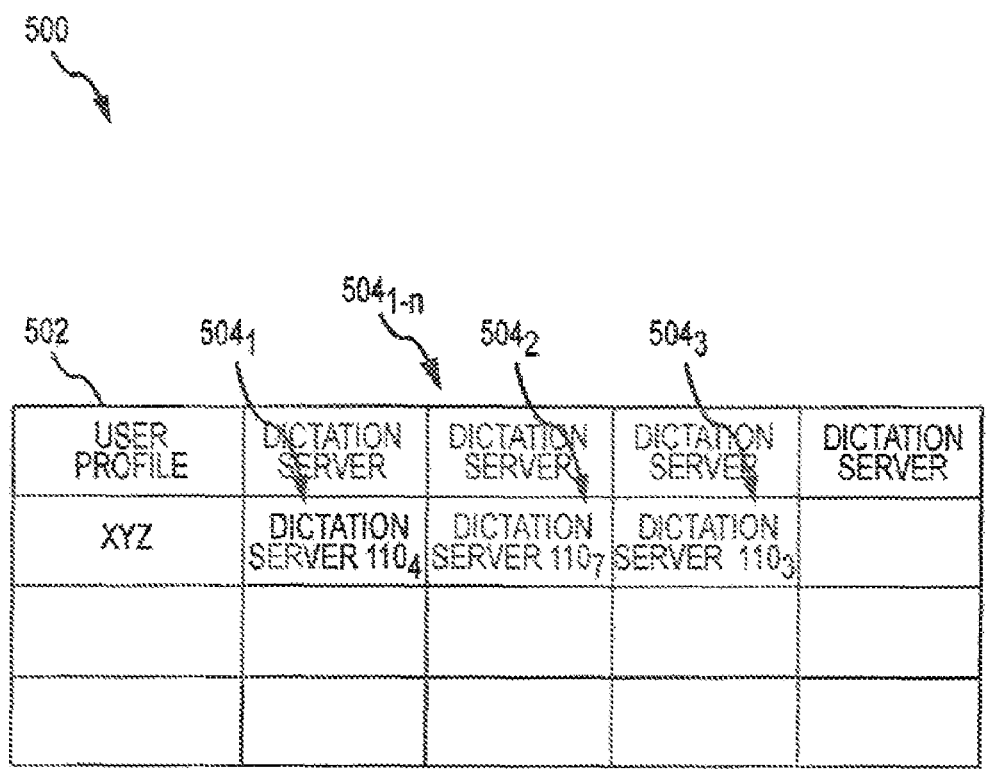
FIG. 5 is a sample database containing information and data used in certain illustrative embodiments of the present invention.

As mentioned above, the dictation manager may track what user profiles are sent to particular dictation servers. For example, as shown in FIG. 5, dictation manager 104 may include a database, such as Database 500 stored in, for example, memory 304. Database 500 may provide a user profile field 502, such as, for example, user profile XYZ representing Charlie Brown's user profile. Database 500 may further provide a series of dictation server fields $504_{1-n}$ that identify dictation server $110_4$ in field $504_1$ that may indicate Charlie Brown's user profile was last uploaded to dictation server $110_4$. Field $504_2$ may identify dictation server $110_7$ was the dictation server that had Charlie Brown's user profile uploaded prior to uploading the profile to dictation server $110_4$. Field $504_3$ may identify dictation server $110_3$ was the dictation server that had Charlie Brown's user profile uploaded prior to uploading the profile to dictation server $110_7$. The history may be maintained as long as desired.

Figure 6:
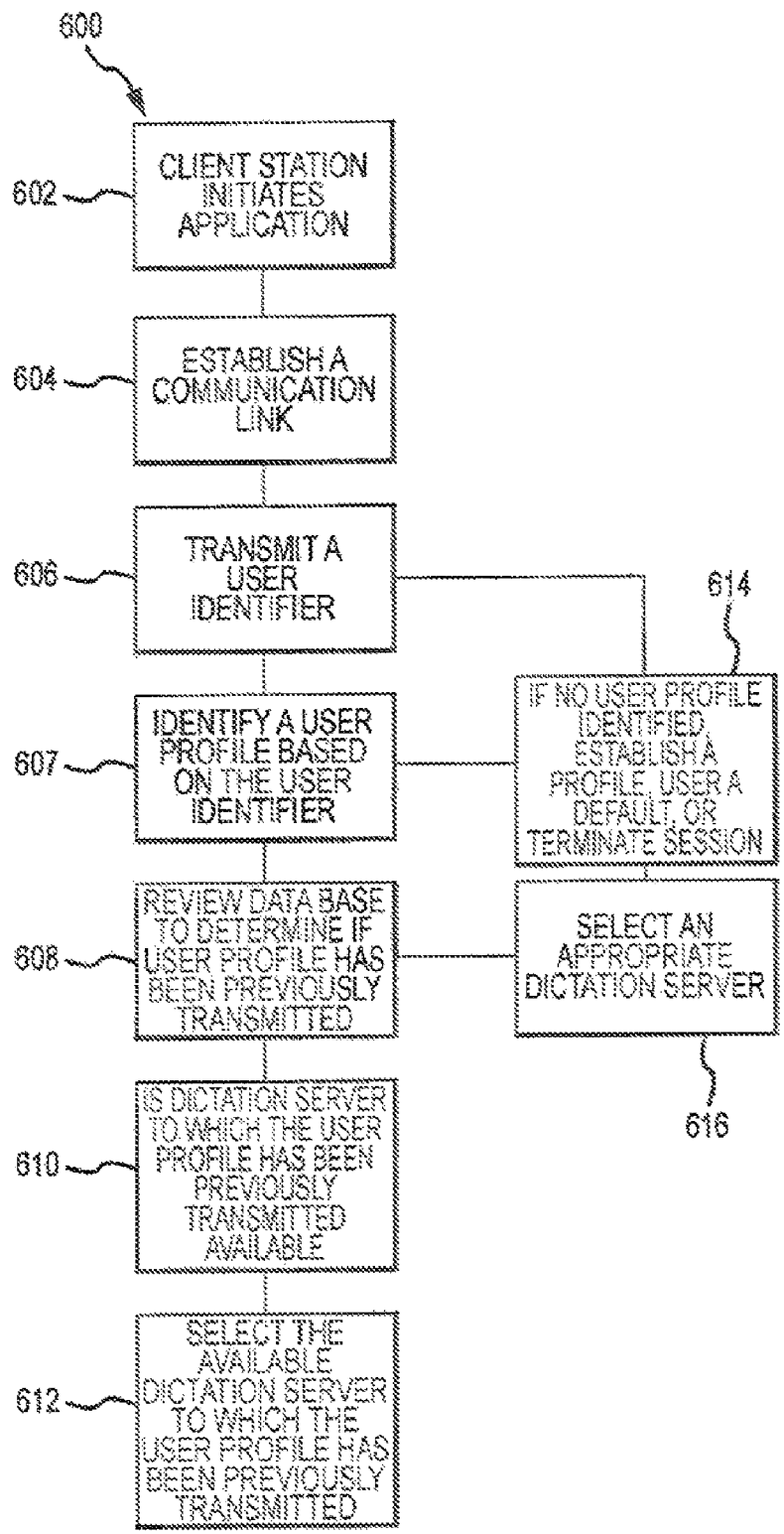
FIG. 6 is a functional block diagram illustrative of a methodology consistent with the technology of the present application.

Referring now to FIG. 6, an exemplary methodology associated with identifying and selecting a dictation server 110 is provided. First, a user of client station 102 initiates an application capable of dictation, step 602, and establishes a communication link to dictation manager 104/202, step 604. User or client station 102 transmits an identifier or user identifier to dictation manager 104/202, such as, for example, a password and login that identifies the user as Charlie Brown, step 606. Dictation manager 104/202 uses the user identifier and matches the user identifier with the appropriate user profile, step 607. Next, dictation manager would review database 500 to determine if Charlie Brown's user profile had been previously uploaded to at least one dictation server, step 608. If Charlie Brown's user profile had been previously uploaded to, for example, dictation server $110_4$, dictation manager 104/202 would next determine whether dictation server $110_4$ is available using conventional methodologies, such as previously described in Marquette and Bahl identified above. If dictation server $110_4$ is available, dictation manager would direct the audio to dictation server $110_4$ without first retrieving and uploading a profile as described above.

If no user profile is identified (or if the user is not identified), a user identifier and a user profile may be established or the user may elect to use a default profile, step 614. Optionally, the call may be terminated. If the user profile has not previously been uploaded, or the user is not identified, does not have a user profile, or a default profile is used, an appropriate dictation sever may be selected using conventional load balancing or resource selection methods as explained in, for example, Marquette or Bahl, step 616.

Figure 7:
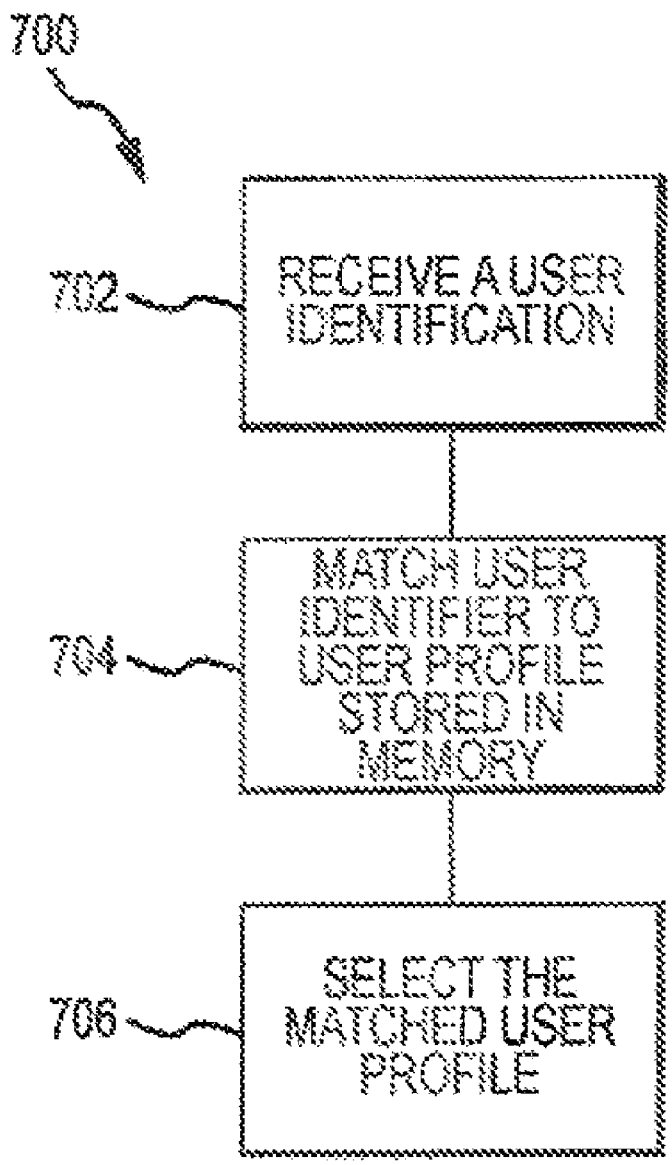
FIG. 7 is a functional block diagram illustrative of a methodology consistent with the technology of the present application.

Referring now to FIG. 7, an exemplary methodology associated with identifying a user profile is provided. First, dictation manager receives a user identification, step 702. User identification, as mentioned above, may be a login identification and password, biometric, or the like as are conventionally known in the art and will not be further explained herein except as necessary to understand the present invention. The dictation manager 104/202 next reviews stored user profiles to determine whether the user identification matches a stored user profile, step 704. If a match is made, the dictation manager selects the matched user profile as the user profile for the user. The memory 304 may, for example, store user profiles and user identifications in a file system or relational database similar to database 500 explained above.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A dictation manager connected to at least one client station and a plurality of dictation servers, comprising:
   at least one network data port to receive audio signals from the connected client station and to transmit the received audio signals to the plurality of connected dictation servers;
   a dictation server selector to select one of the plurality of connected dictation servers to which the received audio signal is transmitted for transcription;
   at least one memory containing a user profile and an indication of whether the user profile has been uploaded and maintained in one of the plurality of dictation servers to which the dictation manager is connected;
   wherein if the dictation server selector determines that the user profile has been uploaded and maintained by one of the plurality of dictation servers, the dictation server selector selects the one of the plurality of dictation servers;
   wherein if the dictation server selector determines that the user profile has not been uploaded or maintained by any of the plurality of dictation servers, the dictation server selector selects any one of the plurality of dictation servers and uploads the user profile.

2. The dictation manager of claim 1 wherein the at least one network data port comprises a plurality of data ports configured to receive and transmit audio signals and data signals.

3. The dictation manager of claim 2 wherein the audio signal is stored in a buffer while the dictation server selector is selecting one of the plurality of dictation servers.

4. The dictation manager of claim 1 wherein the dictation server selector further comprises a load balancer.

5. The dictation manager of claim 4 wherein the dictation server selector selects a dictation server based on a determination of the load balancer.

6. The dictation manager of claim 5 wherein the determination is based on at least one of queue length, average time to process, process load, and memory.

7. The dictation manager of claim 1 further comprising a user profile corrector wherein the dictation manager is further configured to receive corrective textual data from the client station and a user profile corrector updates the user profile based on the corrective textual data.

8. The dictation manager of claim 1, wherein the dictation manager further configured to transmit the received audio to the selected one of the plurality of dictation servers.

9. A method of distributed dictation and transcription performed using at least one processor associated with a dictation manager, the method comprising the steps of:
   receiving an audio signal from a user operating a client station;
   identifying a user profile stored in a memory of the dictation manager associated with the user of the received audio signal;
   determining whether one of a plurality of servers has an affinity for the identified user, wherein the affinity is determined in part by whether one of the plurality of servers is maintaining the identified user profile;
   if it is determined that one of the plurality of servers has an affinity for the identified user based on whether the identified user profile is maintained by one of the plurality of servers, than selecting the one server having the affinity to transcribe the received audio signal;
   causing the received audio signal to be transmitted to the one server wherein the received audio signal is converted into a textual data signal.

10. The method of claim 9 wherein the step of selecting the server also comprises balancing a load between servers.

11. The method of claim 9 wherein the step of determining whether the identified user profile has been previously provided comprises determining at least two servers of the plurality of servers have an affinity for the identified user and the step of selecting the dictation server further comprises selecting one of the at least two dictation servers to balance a load between the at least two servers.

12. The method of claim 9 wherein the step of determining an affinity to the identified user includes a determination that the identified user profile has not been previously provided and the step of selecting the one server from the plurality of servers comprises balancing a load between the plurality of servers and further comprises the step of transmitting the identified user profile to the selected one of the plurality of servers.

13. The method of claim 9, further comprising the step of buffering the audio signal prior to the step of causing the received audio to be transmitted.

14. The method of claim 9 wherein the step of causing the received audio to be transmitted includes causing the client station to transmit the audio signal to the one server.

15. The method of claim 9 further comprising the steps of:
   returning the textual data signal to the client station; and
   displaying the textual data on a display at the client station.

16. A system to provide a client station with a distributed dictation and transcription service comprising:
   at least one dictation manager connected to at least one client station via a connection, the connection comprising at least one of a data port to receive audio signals from the at least one client station, to transmit textual data to the at least one client station, and to receive textual data from the at least one client station;
   a plurality of homogeneous dictation servers comprising at least one transcription engine that transforms audio signals of dictated words to textual data signals;
   at least one connection between the at least one dictation manager and the plurality of homogeneous dictation servers configured to transmit audio signals and textual data signals between the at least one dictation manager and the plurality of homogeneous dictation servers;
   the at least one dictation manager comprising a processor with a means for selecting one of the plurality of homogeneous dictation servers to transform audio signals of dictated words to textual data signals wherein the means for selecting comprises a means for determining whether a user profile is stored in any of the plurality of homogeneous dictation servers; and
   a memory containing at least one user profile.

17. The system of claim 16 wherein the means for selecting one of the plurality of homogeneous dictation servers comprises a load balancer.

18. The system of claim 16 wherein the means for selecting one of the plurality of homogeneous dictation servers comprises a determinator that uses information in the memory to determine whether at least one of the plurality of dictation servers has been provided with the at least one user profile.

19. The system of claim 16 wherein the dictation manager transmits a user profile to the selected one of the plurality of homogeneous dictation servers.

20. The system of claim 19 wherein the audio signal received from the client station by the dictation manager is stored in a buffer while the dictation manager is transmitting the user profile.

21. The system of claim 16 wherein the dictation manager comprises a user profile corrector that updates the user profile based on received corrective textual data from the client station.

* * * * *